Feb. 2, 1943.    L. N. LEUM ET AL    2,309,654
REMOVAL OF MERCAPTANS FROM MERCAPTAN-SOLVENT MIXTURES
Filed March 28, 1941
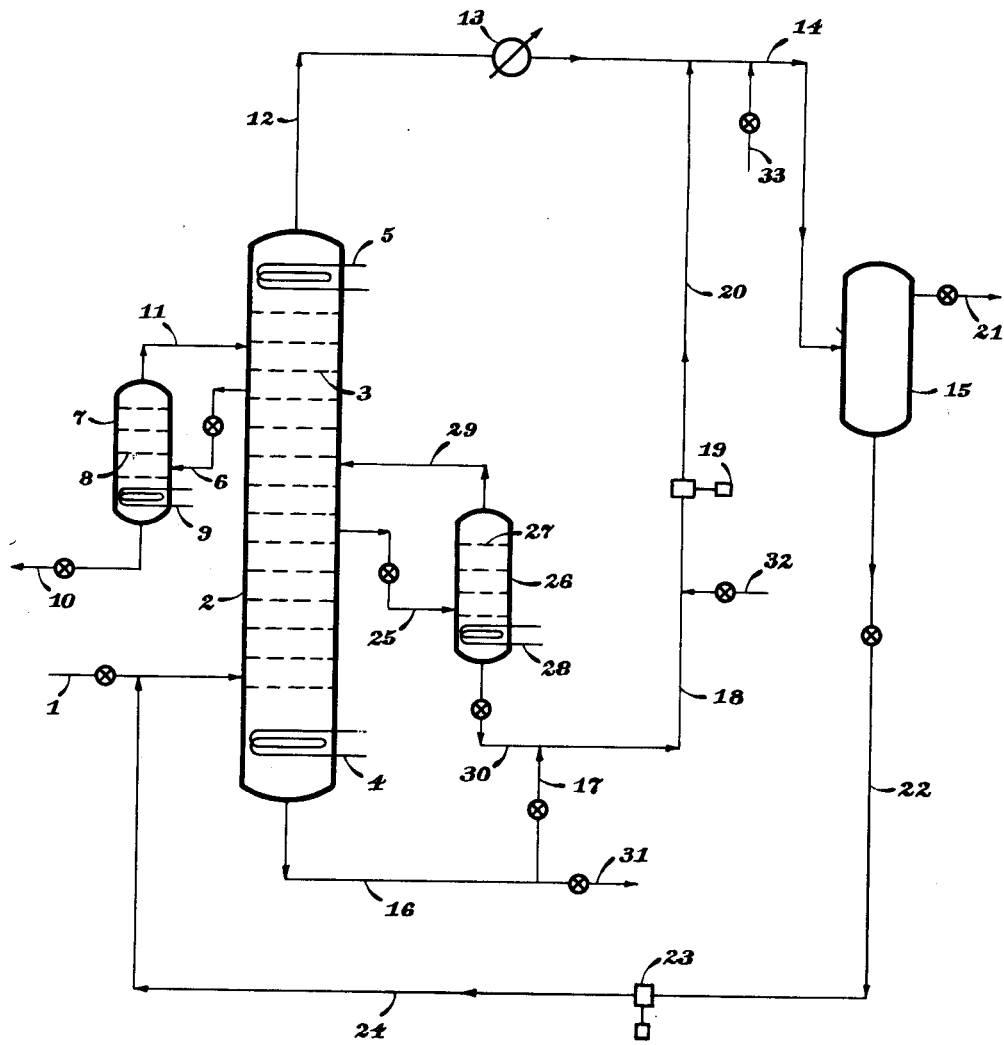
*Attest*
*Inventors*
Leonard N. Leum
Edwin R. Birkhimer
By Norbert E. Birch
*Their Attorney*

Patented Feb. 2, 1943

2,309,654

UNITED STATES PATENT OFFICE 2,309,654

REMOVAL OF MERCAPTANS FROM MERCAPTAN-SOLVENT MIXTURES

Leonard N. Leum, Upper Darby, and Edwin R. Birkhimer, Philadelphia, Pa., assignors to The Atlantic Refining Company, Philadelphia, Pa., a corporation of Pennsylvania Application March 28, 1941, Serial No. 385,656

6 Claims. (Cl. 260—609)

The present invention relates to a method for separating mercaptans from water-soluble organic solvents containing same, and more particularly to the separation of mercaptans from mercaptan-alcohol mixtures produced during the regeneration of spent alcoholic alkali solutions resulting from the treatment of mercaptan-containing hydrocarbon oils with alcoholic alkali solutions.

It has been proposed heretofore to desulfurize hydrocarbon oils, and particularly gasoline, by treating same with alcoholic alkali solutions or alcoholic alkali solutions containing varying amounts of water, whereby mercaptans contained in the gasoline are converted into alkali mercaptides and extracted from the oil. It has also been proposed to regenerate the spent alcoholic alkali solutions containing mercaptides by distilling the alcohol from the spent solution and thereafter heating the residue to decompose the mercaptides and drive off the resulting mercaptans, whereby the alkali is regenerated for reuse. However, one of the major difficulties encountered in this method of regeneration is that in the initial distillation to recover the alcohol from the spent solution, considerable quantities of mercaptans are liberated and thus contaminate the recovered alcohol, thereby rendering same unfit for reuse in the desulfurization of additional quantities of gasoline.

In accordance with the present invention, we have been able to separate from a mercaptan-solvent mixture, and particularly a mercaptan-alcohol mixture, sufficient of the mercaptan content to produce alcohol suitable for use in the desulfurization of hydrocarbon oils. This we accomplish by commingling with the mercaptan-alcohol mixture a quantity of water sufficient to cause the formation of two liquid phases, one comprising predominantly mercaptans and the other comprising alcohol and water. The two liquid phases are permitted to settle and stratify into layers, and the layers are separated from one another by decantation or other suitable method. The phase comprising alcohol and water may then be subjected to fractional distillation to separate the alcohol from the water. The alcohol so recovered is sufficiently free of mercaptans as to be useable for the desulfurization of additional quantities of mercaptan-containing hydrocarbon oil. The quantity of water to be added to the mercaptan-alcohol mixture in order to effect separation will vary, depending upon the mercaptan content of the mixture and the molecular weight of the mercaptans. The lower the molecular weight of the mercaptans, the more water will be required. However, in treating alcohol containing a mixture of mercaptans of different molecular weights, for example, mercaptans having from about 1 to 6 carbon atoms per molecule, we have found that the higher molecular weight mercaptans are preferentially precipitated from the alcohol solution by the addition of water, and when thus rendered immiscible with the solution, will exert a solvent extractive action upon the lower molecular weight mercaptans still in solution, and thus assist in their removal. In general, we have found that by commingling the mercaptan-alcohol mixture with from about 25% to about 300% by volume of water, we are able to effect a substantial separation of the mercaptans from the alcohol, although in most cases from about 25% to about 100% will suffice. For example, treatment of a mercaptan-methanol mixture containing 1900 mg. sulfur as RSH per 100 cc. with 100% by volume of water produced a methanol fraction having 30 mg. sulfur as RSH per 100 cc. The same mixture, when treated with 300% by volume of water, yielded a methanol fraction containing only 10 mg. sulfur as RSH per 100 cc.

Our invention may be further understood with reference to the accompanying drawing, which illustrates diagrammatically a system suitable for carrying out our process.

Referring to the drawing, a mercaptan-solvent mixture, for example, a mercaptan-methanol mixture, is passed in the liquid or vapor phase through valve-controlled pipe 1 into the lower section of fractionating tower 2 provided with bubble trays 3, heating coil 4, and dephlegmating coil 5. Simultaneously, a methanol-water mixture is withdrawn from the bottom of separator 15 by means of valve-controlled pipe 22, and delivered by pump 23 and pipe 24 to the lower section of tower 2, the source of the methanol-water mixture being hereinafter more fully described. Heat may be supplied to the contents of tower 2 by circulating a heating medium, such as steam, through heating coil 4. The mercaptan-methanol is fractionally distilled from the water, and the mercaptan-methanol vapors pass upwardly through the tower, the mercaptans forming with the methanol an azeotropic mixture having a lower boiling point than the methanol. A liquid side stream comprising predominantly methanol and a small amount of mercaptans is withdrawn from tower 2 and introduced through valve-controlled pipe 6 into stripping column 7 provided with bubble traps 8 and heating coil 9. In this column the methanol is substantially stripped of mercaptans, and the resulting methanol, substantially free of or containing a controlled amount of mercaptans, is passed to storage through valve-controlled pipe 10. Such methanol is suitable for use, without further treatment, for the desulfurization of additional quantities of mercaptan-containing hydrocarbon oils. The mercaptans and a minor amount of methanol stripped from the mixture charged to column 7 are withdrawn, as vapors, from the top of the column and are returned to tower 2 by means of pipe 11. The mercaptan-methanol vapor or azeotrope reaching the top of tower 2 is withdrawn therefrom by pipe 12, condensed in condenser 13 and delivered by pipe 14 to separator 15. Concurrently, water substantially free of or containing a reduced content of methanol and mercaptans is passed from the bottom of tower 2 by means of pipe 16, valve-controlled pipe 17, pipe 18, pump 19 and pipe 20 into pipe 14, wherein such water is intimately commingled with the mercaptan-methanol condensate being delivered to separator 15. Additional water may be supplied, if necessary, through valve-controlled pipe 32. The quantity of water thus admixed with the mercaptan-methanol condensate is controlled so as to cause the condensate to form two immiscible liquid phases, one comprising predominantly mercaptans and the other comprising methanol and water. In general, the quantity of water employed will be of the order of 25% to 300% by volume of the mercaptan-methanol condensate.

In separator 15 the two liquid phases are permitted to settle and stratify into layers, and the upper layer of mercaptans is withdrawn by means of valve-controlled pipe 21 and disposed of as desired. The lower layer of water and methanol is drawn from the bottom of the separator and delivered by valve-controlled pipe 22, pump 23, and pipe 24 to fractionating tower 2 for the separation of the methanol from the water by fractional distillation. In order to assist in the separation of the mercaptans from the methanol-water mixture in separator 15, a small amount of hydrocarbon oil, such as petroleum naphtha, may be introduced into the separator through valve-controlled pipe 33 and pipe 14. The naphtha, being miscible with the mercaptans and relatively immiscible with the methanol-water, serves to extract from the latter the more soluble, lower molecular weight mercaptans. The naphtha-mercaptan solution may be drawn from the top of separator by means of valve-controlled pipe 21, and the naphtha separated from the mercaptans for reuse.

As an alternate method of operation, we may charge to the fractionating tower 2 by means of valve-controlled pipe 1, a spent desulfurizing agent comprising a methanol-water solution containing sodium hydroxide and sodium mercaptides, and a methanol-water mixture from separator 15. Under the influence of heat supplied by coil 4, the sodium mercaptides are decomposed to mercaptans, thus regenerating the sodium hydroxide, and the mercaptans along with the methanol and a portion of the water are vaporized and pass upwardly through the tower. During such passage the components are subjected to fractional distillation, and a liquid side stream comprising predominantly water and a small amount of mercaptans and methanol is withdrawn from tower 2 and delivered by valve-controlled pipe 25 to stripping column 26 provided with bubble trays 27 and heating coil 28. In this column the water is substantially freed of mercaptans and methanol, and is withdrawn therefrom by means of valve-controlled pipe 30, while the strippings, i. e., mercaptan-methanol vapors, are passed from the top of the column and returned by pipe 29 to tower 2. The water thus recovered may then be delivered by pipe 18, pump 19, and pipe 20 to pipe 14 for admixture with the condensate from condenser 13.

The mercaptan-methanol vapors, in passing upwardly through tower 2 are subjected to fractionation and stripping in exactly the same manner as described hereinbefore, the side stream stripping column 7 producing methanol of reduced mercaptan content, and the mercaptan-methanol vapors or azeotrope being taken overhead and condensed in condenser 13. The condensate is then commingled with water to effect separation of the mercaptans from the methanol in separator 15.

The aqueous solution of regenerated sodium hydroxide, substantially free of methanol, is withdrawn from the bottom of tower 2 by means of pipe 16 and valve-controlled pipe 31, and may be employed in making up fresh alcoholic-alkali solution for treating additional quantities of mercaptan-containing hydrocarbon oil.

In accordance with our invention it is therefore possible to charge either a mercaptan-methanol mixture or a spent aqueous alcoholic alkaline treating agent to our separating system, and to obtain in one case, methanol having a substantially reduced mercaptan content, and in the other case desulfurized methanol and a regenerated aqueous alkaline solution.

While we have described our invention with reference to the separation of specific mercaptan-methanol mixtures, we are not limited thereto, but may apply our method to other mercaptan-solvent mixtures. For example, mixtures of mercaptans with other aliphatic alcohols such as ethanol, propanol, isopropanol, and the like may be separated in accordance with our invention.

What we claim is:

1. The method of separating mercaptans from a lower aliphatic alcohol containing same, which comprises commingling with the mercaptan-alcohol mixture sufficient water to cause said mixture to form two liquid phases, one comprising predominantly mercaptans and the other comprising alcohol and water, and separating the liquid phases from one another.

2. The method of separating mercaptans from a lower aliphatic alcohol containing same, which comprises commingling with the mercaptan-alcohol mixture sufficient water to cause said mixture to form two liquid phases, one comprising predominantly mercaptans and the other comprising alcohol and water, separating the liquid phases from one another, and fractionally distilling the alcohol from the water.

3. The method of separating mercaptans from methanol containing same, which comprises commingling with the mercaptan-methanol mixture sufficient water to cause said mixture to form two liquid phases, one comprising predominantly mercaptans and the other comprising methanol and water, and separating the liquid phases from one another.

4. The method of separating mercaptans from methanol containing same, which comprises commingling with the mercaptan-methanol mixture sufficient water to cause said mixture to form two liquid phases, one comprising predominantly mercaptans and the other comprising methanol and water, separating the liquid phases from one another, and fractionally distilling the methanol from the water.

5. The method of separating mercaptans from methanol containing same, which comprises commingling with the mercaptan-methanol mixture from about 25 percent to about 300 percent by volume of water to cause the formation of two liquid phases, one comprising predominantly mercaptans and the other comprising methanol and water, and separating the liquid phases from one another.

6. The method of separating mercaptans from methanol containing same, which comprises commingling with the mercaptan-methanol mixture from about 25 percent to about 300 percent by volume of water to cause the formation of two liquid phases, one comprising predominantly mercaptans and the other comprising methanol and water, separating the liquid phases from one another, and fractionally distilling the methanol from the water.

LEONARD N. LEUM.
EDWIN R. BIRKHIMER.